(12) United States Patent
Lendi

(10) Patent No.: US 12,096,103 B2
(45) Date of Patent: Sep. 17, 2024

(54) INSPECTION AND/OR CLEANING NOZZLE WITH CAMERA HOUSING

(71) Applicant: Enz Technik AG, Giswil (CH)

(72) Inventor: Christoph Lendi, Giswil (CH)

(73) Assignee: Enz Technik AG, Giswil (CH)

( * ) Notice: Subject to any disclaimer, the term of this patent is extended or adjusted under 35 U.S.C. 154(b) by 320 days.

(21) Appl. No.: 17/749,281

(22) Filed: May 20, 2022

(65) Prior Publication Data

US 2022/0377211 A1 Nov. 24, 2022

(30) Foreign Application Priority Data

May 21, 2021 (CH) ..................................... 00580/21

(51) Int. Cl.
| | | |
|---|---|---|
| *H04N 23/51* | (2023.01) | |
| *B08B 3/02* | (2006.01) | |
| *B08B 13/00* | (2006.01) | |
| *H04N 23/50* | (2023.01) | |

(52) U.S. Cl.
CPC ............... *H04N 23/51* (2023.01); *B08B 3/02* (2013.01); *B08B 13/00* (2013.01); *H04N 23/555* (2023.01)

(58) Field of Classification Search
None
See application file for complete search history.

(56) References Cited

U.S. PATENT DOCUMENTS

| | | | | |
|---|---|---|---|---|
| 9,962,746 | B2 * | 5/2018 | Bauer | B05B 3/00 |
| 10,638,024 | B1 * | 4/2020 | Dresang | H04N 23/52 |
| 2014/0073238 | A1 * | 3/2014 | Henn | H04Q 9/00 |
| | | | | 455/7 |
| 2014/0176696 | A1 * | 6/2014 | Chapman | H04N 23/50 |
| | | | | 348/84 |
| 2014/0247338 | A1 * | 9/2014 | Kessler | E03F 7/12 |
| | | | | 239/289 |

(Continued)

FOREIGN PATENT DOCUMENTS

| | | |
|---|---|---|
| CH | 707691 A2 | 9/2014 |
| DE | 29721528 U1 | 2/1998 |

(Continued)

*Primary Examiner* — Gelek W Topgyal
(74) *Attorney, Agent, or Firm* — Paul D. Bianco; Fleit Intellectual Property Law

(57) ABSTRACT

An inspection and/or cleaning nozzle for operation with liquids under high pressure includes a coupling section coupleable to a high-pressure tube and a camera recess running concentric to a longitudinal axis arranged in a camera-receiving portion. A camera module is accommodated releasably connected to an encapsulated water-tight camera housing. Optics and camera electronics are permanently incorporated in the camera housing such that the optics and camera electronics are protected in the interior of the camera housing and fogging of the optics is prevented. This is achieved in that a bore is made in the wall of camera housing running radially across the longitudinal axis direction, the opening of bore is sealed water-tight and air-tight with a membrane, so that the surface of membrane fully overlaps the opening of bore. This surface of the membrane is made correspondingly larger than bore and the membrane is formed multilayered from a laminate film.

7 Claims, 2 Drawing Sheets

(56) References Cited

U.S. PATENT DOCUMENTS

| | | | |
|---|---|---|---|
| 2016/0129486 A1* | 5/2016 | Bauer | H04N 23/54 |
| | | | 134/167 C |
| 2017/0176737 A1* | 6/2017 | Haffner | G02B 23/2492 |
| 2020/0179995 A1* | 6/2020 | Loades | B08B 9/0495 |

FOREIGN PATENT DOCUMENTS

| | | | | |
|---|---|---|---|---|
| DE | 202011104073 U1 | | 11/2011 | |
| EP | 3017885 A1 | * | 5/2016 | B05B 13/0627 |
| WO | WO-2018083462 A1 | * | 5/2018 | B08B 9/0433 |

* cited by examiner

Prior Art

INSPECTION AND/OR CLEANING NOZZLE WITH CAMERA HOUSING

TECHNICAL FIELD

The present invention describes an inspection nozzle and/or cleaning nozzle for operation with liquids under high pressure with a coupling section that can be coupled to a high-pressure tube, wherein a camera recess running concentric to a longitudinal axis is arranged in a camera-receiving portion, wherein a camera module is accommodated releasably connected to a camera housing encapsulated water-tight, wherein optics and camera electronics are permanently incorporated in the camera housing.

BACKGROUND

Cleaning nozzles or inspection nozzles equipped with a camera or, more generally, an optical sensor are guided with a liquid under high pressure through pipes and conduits, wherein the interior walls and generally a cleaning effect conducted previously or simultaneously are checked. Employed liquid pressures of the supplied liquids lie in the range of 10 bar to a few hundred bar.

A high-pressure cleaning nozzle with a video camera is described in utility model DE202021104073. The cleaning nozzle has a plurality of multipurpose nozzles, which serve for cleaning and/or propulsion and/or to clean the camera.

A pipe-cleaning nozzle with a nozzle head in which a camera is integrated is also disclosed in German utility model DE29721528. The purpose here is again to avoid a separate device for inspection of the pipe being cleaned and instead to couple the cleaning device and the inspection device. This pipe-cleaning nozzle has a camera and an illumination means in the nozzle head, in which case wiring to supply electrical power is described. A central receptacle in a multipart nozzle head is shown in the figure, in which the camera is positioned. Since a cleaning nozzle rotatable about the longitudinal axis is assumed, a slip ring contact arrangement is positioned to convey a camera supply line from the outside of the cleaning nozzle to the camera.

FIG. 1A shows the inspection nozzle 0 known from CH707691 of the applicant, which consists of a coupling unit 1 and a camera-receiving portion 2 with a camera recess 20. The coupling unit 1 extends in the longitudinal direction L to the camera-receiving portion 2 from coupling unit 1 with a coupling section 10, via a feed bore 11 and a deflection chamber 12, which discharges into bores 13. The matching camera recess 20 to accommodate a camera module 3 is arranged in the camera-receiving portion 2 so that the camera module 3 can be fastened by fastening devices 22 in fastening device recesses 21 provided for this purpose.

The camera module 3 typically has a camera housing with optics, camera electronics as well as illumination means and battery and an arrangement on circuit boards situated therein. The overall inspection nozzle 0 includes components that are releasably connected one to another, and the camera module 3 is also secured releasably in the camera-receiving portion 2. The sensitive camera electronics, optics and the battery must be protected from environmental effects, for which a water-tight encapsulation is required. In order to protect the components, no cleaning fluid should be able to penetrate into the camera module 3 or the camera housing 30.

With conventional TV inspection robots and some competitors, the camera housing is even acted upon by an overpressure so that pressure fluctuations cannot occur during operation. Among other things, fogging of the camera optics should thereby be prevented.

During pipe cleaning, a partial vacuum develops in the pipe or conduit in front of the cleaning nozzle with camera module 0, whereas an overpressure can occur in the camera housing in the interior of the camera module, for example, from a temperature increase of the electronic components. By filling the internal space of the camera housing with a gas combined with continuous, live-monitored pressure measurements in the interior of the camera housing, a leak or pressure fluctuation can be recognized and the inspection nozzle 0 retrieved, as required.

Experiments have now shown that during operation at 2000 m above sea level, for example, an overpressure develops within the camera housing that can have negative effects on the electronic components and the optics 31 from about 150 hPa. The temperature of the interior of the encapsulated camera housing is also changed because of rapid pressure fluctuations, which can be either the cause or effect of pressure fluctuations.

The camera housing must be fully encapsulated so that no liquid, which is supplied under high liquid pressures, can penetrate the camera housing. To achieve this, plug connections to current-carrying cables have already been avoided and a battery positioned in the camera housing. In the event of a defect, it is this battery which could also lead to high internal pressure in the camera housing, which thus far has not been dealt with structurally.

SUMMARY OF THE INVENTION

One aspect of the present invention relates to an inspection nozzle for operation with liquids under high pressure, which is equipped with an improved camera housing, so that the optics and camera electronics in the interior of the camera housing are permanently protected and fogging of the optics is prevented. By means of the camera housing according to the invention, the inspection nozzle is even protected against destruction in the event of a defect of the battery situated in the internal space of the camera housing.

BRIEF DESCRIPTION OF THE DRAWINGS

A preferred embodiment example of the subject matter of the invention is described below in conjunction with the appended drawings in the detailed description.

Variations of feature combinations and respective adjustments of the invention can be found in the detailed description, depicted in the figures and included in the claims.

In the drawings:

FIG. 1A shows a perspective view of an inspection nozzle known from the prior art, whereas FIG. 1B shows a longitudinal section through the inspection nozzle according to FIG. 1A known from the prior art along the longitudinal axis.

FIG. 2 shows a longitudinal section through an inspection nozzle with an adapted camera module or camera housing.

FIG. 3 shows part of a longitudinal section of the camera housing in a camera-receiving portion 2 according to the section indicated in FIG. 2 in the area of a membrane during an overpressure in the interior of the camera housing.

DESCRIPTION

Figure 1A:
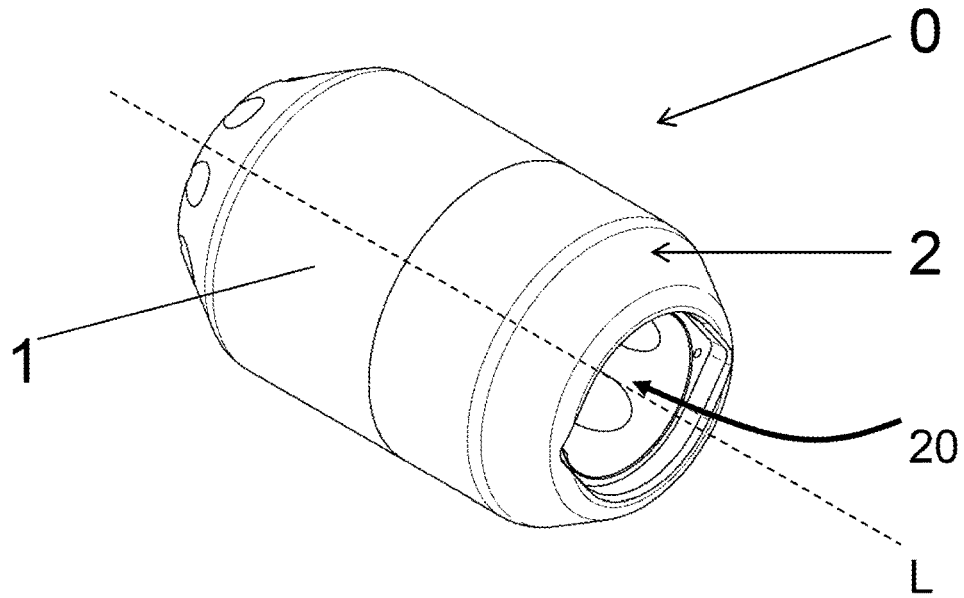

An inspection nozzle or cleaning nozzle 0 with a camera nozzle 3 is depicted as an example, which here shows parts separable from each other, a coupling unit 1 and a camera-receiving portion 2. Both parts 1, 2 are made as robustly as possible from metal and can be releasably connected to each other. Both parts 1, 2, however, could also be made in one piece or one part. The coupling unit 1 includes a feed bore 11 in a coupling section 10. During operation, liquid under high pressure, at least 10 bar, but generally much more, is introduced through feed bore 11 by means of a high pressure tube (not shown) fastened to coupling section 10. The coupling unit 1 also has a deflection chamber 12, into which the feed bore 11 discharges, and at least one bore 13 directed backward, which is equipped with a nozzle insert 130. Fastening of the high-pressure tube to coupling section 10 and to the feed bore are not taken up in greater detail here, as these are known to a person skilled in the art. The high-pressure tube carries a cleaning agent, for example, wastewater or fresh water, in the cleaning insert under high pressure of a few bar to a few hundred bar, which after deflection in deflection chamber 12 emerges from the at least one bore 13 and the at least one nozzle insert 130.

The bores 13 are arranged pointing backward, i.e., in the direction of the high pressure tube. The overall inspection nozzle 0, accordingly, can be moved when acted upon by pressure in the feed direction indicated with the arrow. A cleaning effect of the surrounding pipe or conduit walls can be achieved, in addition to propulsion, through the liquid emerging from bore 13 and the at least one nozzle insert 130. Several bores 13 and differently oriented bores 13 can, of course, lead to an improved cleaning effect, which is adjustable as desired.

Figure 1B:
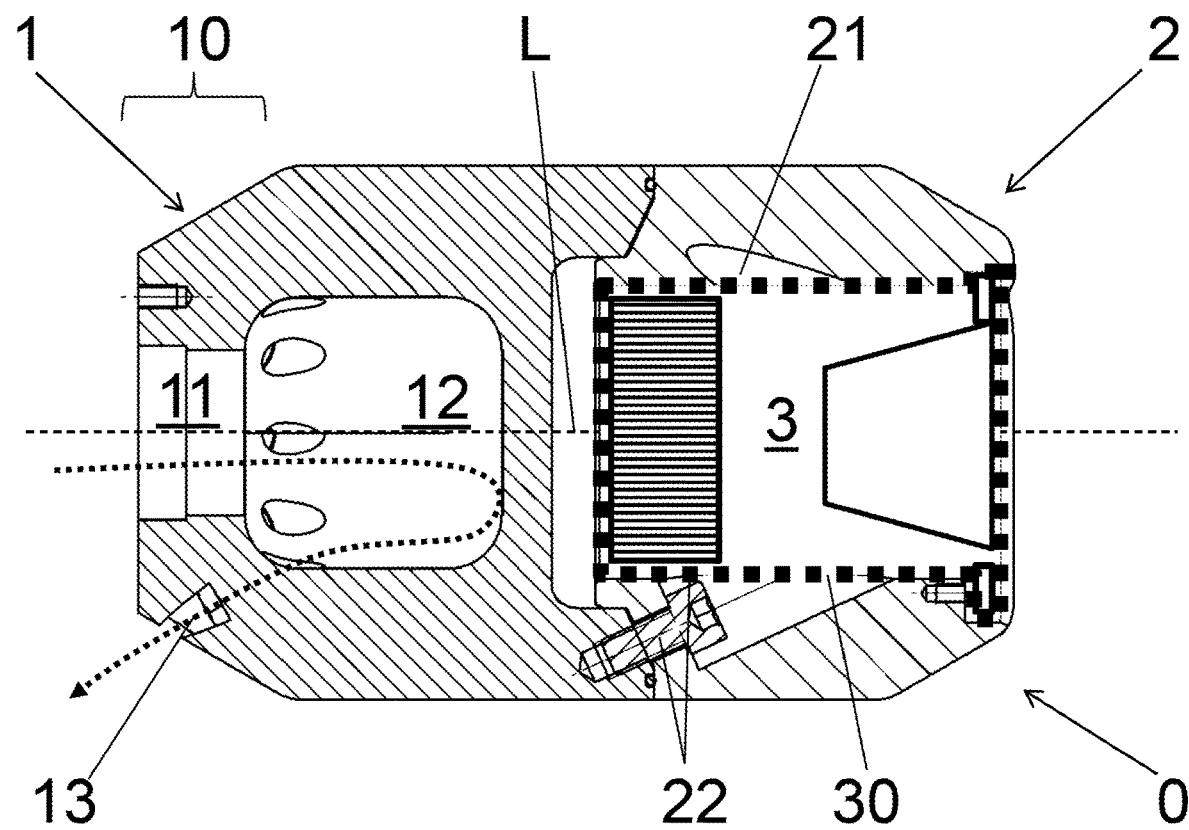
Figure 2:
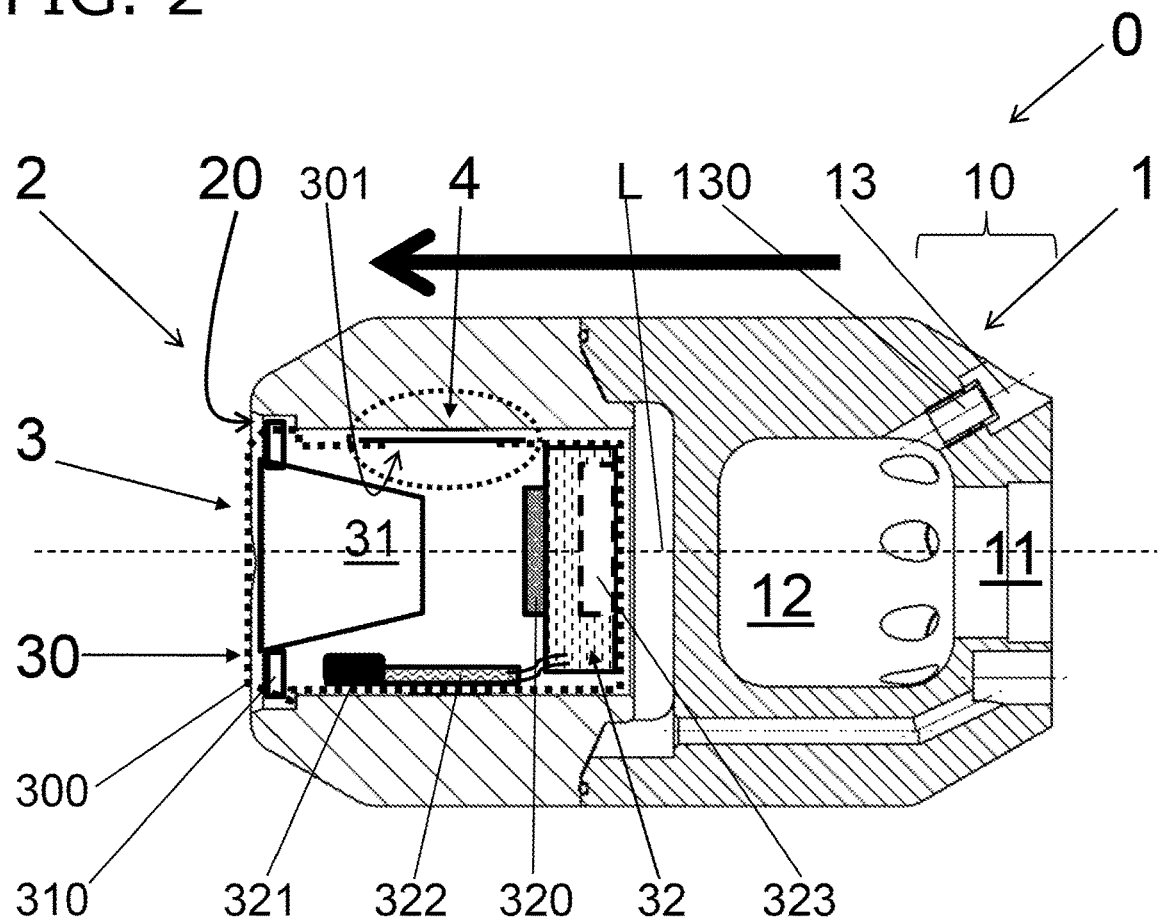

The camera-receiving portion 2 separable from the coupling unit 1 has a camera recess 20, which is accommodated in the camera-receiving portion 2 concentric to the longitudinal axis L. An empty space is optionally left between coupling unit 1 and the camera-receiving portion 2. The camera recess 20 is adjusted to a camera module 3 and its outer camera housing 30, so that the camera housing 30 fills the camera recess 20. As indicated in FIGS. 1A and 1B, fastening device recesses 21 (not shown in FIG. 2) are provided in camera-receiving portion (2), which are provided with fastening devices 22 for fixation of the camera module 3 and the camera housing 30. When coupling unit 1 and camera-receiving portion 2 are made separately, these parts 1, 2, like camera module 3, are configured to be releasably connected form-fit and/or force-fit in the camera-receiving portion 2 for assembly and maintenance purposes. The camera housing 30 is, of course, introduced on the side of the camera-receiving portion 2 separated from the feed bore 11 and releasably fastened there.

The camera module 3 has optics 31 and camera electronics 32 in addition to the camera housing 30. The optics 31 include illumination means 310 and focus collected light onto an image sensor 320 as part of the camera electronics 32.

The camera electronics 32 are based on a circuit board equipped with components in which the conventional semiconductor-based image sensors for light up to the mid-infrared region are known to one skilled in the art and the corresponding commercially available camera electronics 32. Only through illumination devices of illumination means 310 are recordings of a camera image in underground conduits and pipes possible, for which reason illumination means 310 is an important part of optics 31.

Here the camera electronics 32 include a camera switch 321, a circuit board 322 and a battery 323, in addition to the circuit board and image sensor 320, all components being arranged fixed in the interior of the camera housing 30. The camera housing 32 has all the necessary components so that images and videos can be recorded, stored and/or transmitted after installation of the camera module 3 into the inspection nozzle or cleaning nozzle 0, in which case the encapsulated, water- and air-tight camera housing 30 can remain in the inspection or cleaning nozzle 0.

In order to protect the camera electronics 32 and all components within the camera housing 30 from environmental effects, i.e., especially the liquid supplied under high pressure, but also from mechanical effects, the wall of the camera-receiving portion 2 must be as robust as possible. This is achieved with metallic camera-receiving portions 2 and ordinary wall thicknesses. The camera housing 30 must also be designed correspondingly thick-walled and/or made from metal. Thick-walled is understood here to mean wall thicknesses of preferably 1 mm. In addition, if the wall of the camera housing 30 is designed spot-welded here, the camera housing 30 is designed encapsulated air- and water-tight.

The camera recess 20 in camera-receiving portion 2 is only slightly larger than the outside dimension of the camera housing 30, and the camera housing 30 is fastened by means of fastening devices 22. The camera housing 30 after installation of all camera electronic components is also encapsulated and sealed water-tight and then placed in the camera recess 20. An external collar 300 is additionally arranged here on the camera housing 30 on the side opposite camera electronics 32 so that a stop is reached during introduction of the camera housing 30.

To solve the problem posed here, a bore 301 was introduced to the side wall of the camera housing 30 in the form of a through-hole through the wall of camera housing 30, having an opening that was sealed water-tight and air-tight with a membrane 4. Pressure equalization in the interior of camera housing 30 can occur through the sufficiently thin membrane 4. The membrane 4 can also bend slightly outward, away from the side wall, or in the inward direction, toward the interior of chamber housing 30.

The membrane 4 is preferably made from plastic. For simple installation the membrane 4 can be configured as self-adhesive membrane 4 with a plastic layer. The membrane 4 is preferably glued onto the outer surface of the side wall of camera housing 30, fully overlapping bore 301. To realize function, however, the membrane 4 can also be fastened on the inside surface of the side wall of camera housing 30. The preferred film thickness of membrane 4 is greater than or equal to 50 µm, preferably greater than 100 µm. Protection from dust and water and pressure equalization properties must be achieved.

Figure 3:
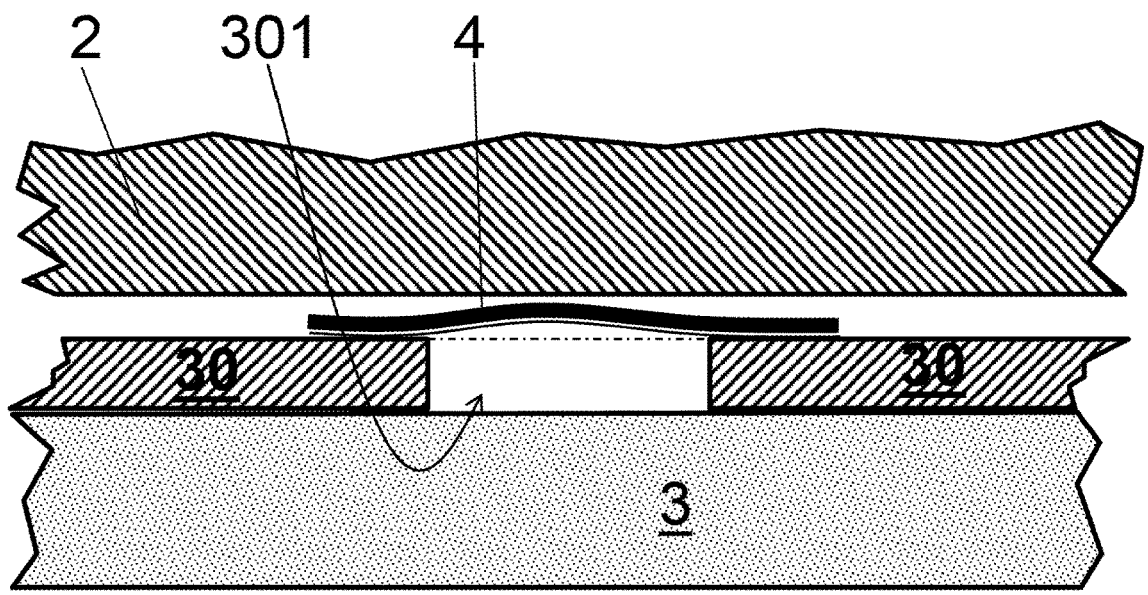

The bore 301 in the side surface of camera housing 30 is made here in the center between collar 300 and the end surface of camera housing 30 in the radially peripheral wall. Sufficient room is left between the fixed membrane 4 and the inside surface of camera recess 20, so that membrane 4 can also be bent away from camera housing 30, i.e., pressure can be equalized between the interior and the exterior. This is shown schematically in FIG. 3. The preferred spacing between the outer surface of membrane 4 and the inner surface of camera recess 20 is 1 mm and more.

In order to permit sufficient pressure equalization but not to weaken the camera housing 30 too severely, the bore 301 should have a circular cross section with a radius between 1 mm and 4 mm. The membrane 4 must be made correspondingly larger, preferably also as a circular film.

In addition to production purely from plastics, the membrane 4 can also be configured as a self-adhesive multilayered laminate film with a metal layer.

One or more forward directed purge bores or purge nozzles can optionally be introduced to the camera-receiving portion 2. Fluid feed channels would be made accordingly in the deflection chamber 12 in coupling unit 1, which discharge into the purge bores so that cleaning agent can emerge from the deflection chamber 12 forward from the camera recess 20 at a spacing via the fluid feed channels from the purge bores.

The design of a backward slope on the coupling unit 1 and a slope on the camera-receiving portion 2 on the camera side facilitate movement of the inspection nozzle 0 in both directions within a pipe during operation, since interfering edges are avoided as obstacles.

LIST OF REFERENCE NUMBERS

0 Inspection nozzle or cleaning nozzle with camera module
1 Coupling unit
10 Coupling section
    Coupling device recess
11 Feed bore
    Inside thread
12 Deflection chamber
13 Bore
130 Nozzle insert
2 Camera-receiving portion
20 Camera recess
21 Fastening device recess
22 Fastening device
L Longitudinal direction
3 Camera module
30 Camera housing
300 Collar
301 Bore
31 Optics
310 Illumination means
32 Camera electronics
320 Image sensor
321 Camera switch
322 Circuit board
323 Battery
4 Membrane

The invention claimed is:

1. An inspection and/or cleaning nozzle for operation with liquids under high pressure with a coupling section that can be connected to a high-pressure tube, wherein a camera recess running concentrically to a longitudinal axis is arranged in a camera-receiving portion, wherein a camera module can be accommodated releasably connected to an encapsulated camera housing sealed water-tight, optics and camera electronics being permanently incorporated in camera housing, wherein a bore is arranged in the wall of camera housing running radially across the direction of longitudinal axis, the opening of bore is sealed water-tight and air-tight with a membrane so that the surface of the membrane fully overlaps the opening of bore, the surface of membrane being correspondingly larger than the bore and the membrane formed multilayered from a laminate film.

2. The inspection and/or cleaning nozzle according to claim 1, wherein the membrane is made from plastic and has a circular cross-sectional surface.

3. The inspection and/or cleaning nozzle according to claim 1, wherein the membrane includes at least one self-adhesive plastic layer.

4. The inspection and/or cleaning nozzle according to claim 1, wherein the membrane is adhered onto an outer surface of the side wall of camera housing, fully overlapping the bore.

5. The inspection and/or cleaning nozzle according to claim 1, wherein a film thickness of the membrane is greater than or equal to 50 µm.

6. The inspection and/or cleaning nozzle according to claim 1, wherein a spacing between the outer surface of membrane and the inner surface of camera recess is 1 mm and more.

7. The inspection and/or cleaning nozzle according to claim 1, wherein the membrane has a circular cross-sectional surface and wherein a radius of the membrane lies between 1 mm and 4 mm.

* * * * *